United States Patent
Isoyama

(12) 
(10) Patent No.: US 6,169,739 B1
(45) Date of Patent: Jan. 2, 2001

(54) ATM VLAN MULTI-PROTOCOL CLIENT-SERVER SYSTEM USING LAYER-3 HEADER OF PACKETS FOR TRANSPORTING CONNECTIONLESS AND CONNECTION-ORIENTED TRAFFIC

(75) Inventor: Kazuhiko Isoyama, Tokyo (JP)

(73) Assignee: NEC Corporation, Tokyo (JP)

(*) Notice: Under 35 U.S.C. 154(b), the term of this patent shall be extended for 0 days.

(21) Appl. No.: 09/004,444

(22) Filed: Jan. 8, 1998

(30) Foreign Application Priority Data

Jan. 8, 1997 (JP) .................................... 9-001103

(51) Int. Cl.[7] .................................................. H04L 12/28
(52) U.S. Cl. ............................................ 370/395; 370/400
(58) Field of Search .................... 370/395, 396, 370/410, 401, 402, 403, 404, 389, 392, 400; 709/201, 203, 246, 245

(56) References Cited

U.S. PATENT DOCUMENTS

| | | | |
|---|---|---|---|
| 5,600,644 | * 2/1997 | Chang et al. | 370/404 |
| 5,617,540 | * 4/1997 | Civanlar et al. | 395/200.11 |
| 5,812,552 | * 9/1998 | Arora et al. | 370/401 |
| 5,822,320 | * 10/1998 | Horikawa | 370/396 |
| 5,825,772 | * 10/1998 | Dobbins et al. | 370/401 |
| 5,828,844 | * 10/1998 | Civanlar | 370/400 |
| 5,878,212 | * 3/1999 | Civanlar et al. | 395/200.33 |
| 6,016,319 | * 1/2000 | Kshirsagar | 370/410 |

OTHER PUBLICATIONS

"The ATM Forum Technical Committee", Multi–Protocol Over ATM Version 1.0, ATM Forum/BTD–MPOA–MPOA–MPOA–01.13, Feb. 1997, pp. 3–4 and 9–10.

* cited by examiner

*Primary Examiner*—Chi H. Pham
*Assistant Examiner*—Steven Nguyen
(74) *Attorney, Agent, or Firm*—Sughrue, Mion, Zinn, Macpeak & Seas, PLLC

(57) ABSTRACT

In an ATM network, each logical subnetwork comprises a server for resolving an ATM address using layer-3 address of request message and routing a packet to the network by using a layer-3 address of the packet. A source client examines a layer-3 header of a packet to determine whether its mode of transmission is connection-oriented or connectionless, and transmits the packet, if it is connectionless, to the server for causing it to route the packet through the network, and transmits, if the packet is connection-oriented, an ATM address resolution request message to the server. The source client receives a reply message from the server containing a resolved ATM address, and transmits a signaling message containing the resolved ATM address to the network to establish a connection. Over the established connection, the source client transmits data packets.

11 Claims, 2 Drawing Sheets

ATM VLAN MULTI-PROTOCOL CLIENT-SERVER SYSTEM USING LAYER-3 HEADER OF PACKETS FOR TRANSPORTING CONNECTIONLESS AND CONNECTION-ORIENTED TRAFFIC

BACKGROUND OF THE INVENTION

1. Filed of the Invention

The present invention relates to a multi-protocol client-server system for ATM (asynchronous transfer mode) virtual LANs (local area networks).

2. Description of the Related Art

With the expansion of the Internet and the increasing complexity of local area networks, businesses are focusing their attention on virtual local area networks (or VLANs), or subnets which can be created within an existing ATM network without restrictions which would otherwise be imposed by the physical topology of the network. The use of LAN emulation protocol is one way of implementing a virtual LAN in an ATM network. The IPOA (Internet Protocol over ATM) is one of such LAN emulation protocols. However, routers are still required for transporting packets between subnets because the IPOA emulation is based on the physical structure of the ATM network. Since the functions of a router are to reassemble arriving ATM cells into IP packets and then invoke a routing procedure, the amount of time taken by cell assemblage and packet routing is substantial. Another approach is the use of NHRP (next hop resolution protocol) which allows connections to be directly established over several subnets without using routers. Instead of routers, next hop servers are installed to exchange request and reply messages to resolve an ATM address and communicate the address to the requesting source. However, the address resolution time represents a substantial overhead for single packet transmissions, or datagrams.

Multi-protocol over ATM is proposed by the ATM forum. According to the Multi-Protocol Over ATM (MPOA), Version 1.0, February 1997 (ATM Forum/BTD-MPOA-MPOA-01.13), a traffic counter is used for measuring traffic of packets by looking up their source/destination address field. If the amount of traffic exceeds a predefined threshold, the traffic is recognized as a continuous stream of packets and the network changes the mode of transmission from hop-by-hop, connectionless mode to connection-oriented mode by establishing a connection.

However, the shortcoming, of the proposed multi-protocol for ATM networks is that, since initial packets of a data stream are still routed on a hop-by-hop basis, network routers must be capable of handling such packets as well as datagrams. There is still a need to decrease the connectionless traffic offered to routers.

SUMMARY OF THE INVENTION

It is therefore an object of the present invention to provide a simple and yet effective solution to the problem by looking up the layer-3 header address of packets to discriminate between connectionless and connection-oriented traffic.

The present invention provides an ATM network comprising a plurality of logical subnetworks, each of the logical subnetworks comprising a server and at least one client, the server having means for resolving ATM addresses of destination clients from a layer-3 address of an ATM address resolution request message from a source client and means for routing a packet through the network by using a layer-3 address of the packet. The source client examines a layer-3 header of a packet to determine whether the packet has a connection-oriented traffic or a connectionless traffic. If the packet has a connectionless traffic, the source client transmits, the packet to the server for causing it to route the packet through the network, and transmits, if the packet has a connection-oriented traffic, an ATM address resolution request message to the server. The source client receives a reply message from the server containing a resolved ATM address, and transmits a signaling message containing the resolved ATM address to the network to establish a connection. Over the established connection, the source client transmits data packets.

BRIEF DESCRIPTION OF THE DRAWINGS

The present invention will be described in further detail with reference to the accompanying drawings, in which.

DETAILED DESCRIPTION

Figure 1:
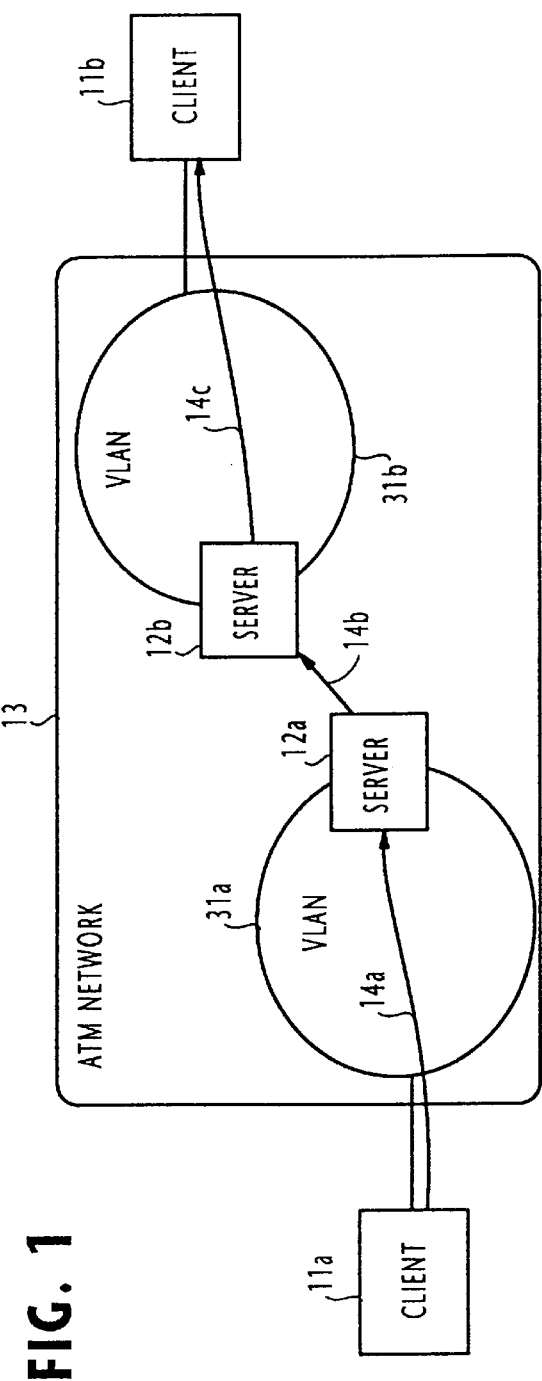
FIG. 1 is a block diagram of an ATM network according to the present invention in the case of connectionless traffic.

Referring now to FIG. 1, there is shown an ATM network embodying the present invention. The network, indicated by numeral 13, comprises logical subnets, or virtual LANs 31a and 31b interconnected by a server 12a on the side of VLAN 31a and a server 12b on the side of VLAN 31b. Client terminals 11a and 11b are connected to VLANs 31a and 31b, respectively. Each of the VLAN servers has a Next Hop Resolution Protocol (NHRP) function for resolving an ATM address of a destination client by using a layer-3 address of a received message, and a routing function for routing a packet to the server of another subnetwork by using the layer-3 address of the packet. As default information, each of the VLAN client terminals has a memory for holding the ATM address of the VLAN server of its own subnetwork.

Figure 2:
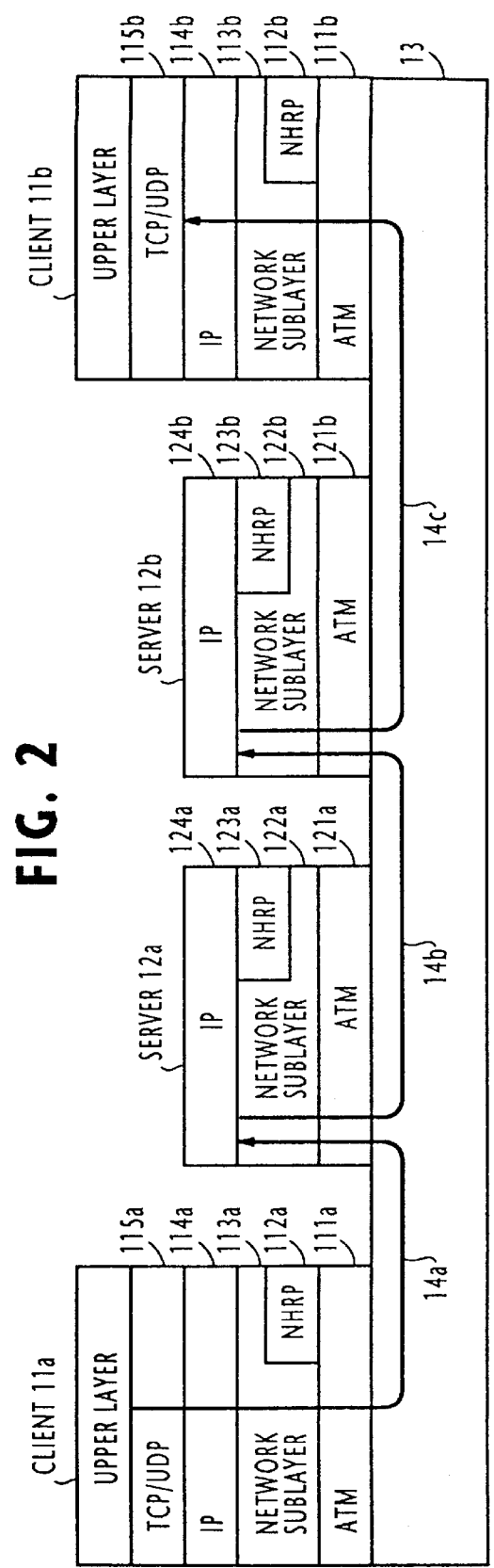
FIG. 2 is an illustration of protocol stacks of the ATM network and signal paths in the case of the connectionless traffic.

Protocol stacks of the ATM network are shown in FIG. 2. As illustrated, each of the clients 11a, 11b has an ATM layer (layer-1) 111 at the lowermost of its own protocol stack, a client's routing layer (layer-2) 112 in which resides the NHRP 113 interfacing the ATM layer 111, an IP layer (layer-3) 114 and a TCP/UDP layer (layer-4) 115. Each of the VLAN sewers 12a, 12b has an ATM layer (layer-1) 121, a server's routing layer (layer-2) 122 in which the NHRP 123 resides, and an IP layer (layer-3) 124 which interfaces the NHRP 123.

As a layer-3 protocol, the network employs IPv6 protocol. According to this protocol, the layer-3 header of the IPv6 packet contains a priority field for establishing the identity of an upper layer application. By examining this priority field, each VLAN client determines whether the packet has a connectionless traffic or connection-oriented traffic.

When the client 11a forwards a packet received from an upper layer, examines the network address of the destination address field of the packet's header and the priority field.

The operation of the network for transporting a single packet, or datagram and a series of consecutive packets, using the IPv6 protocol from client 11*a* to client 11*b* proceeds as follows.

If the address field of a packet contains the network address of VLAN 31*b* and the value of the priority field is "2" (e.g., email) or "7" (e.g., SNMP, simple network management protocol), the source client 11*a* recognizes that the packet has a connectionless traffic and forwards it as a datagram to the server 12*a* over a path 14*a* as shown in FIGS. 1 and 2. Upon receipt of this datagram, the server 12*a* examines the layer-3 header of the datagram and uses its routing function for routing it to the server 12*b* over a path 14*b*. In like manner, the datagram is routed through the VLAN 31*b* using the routing function of server 12*b* to the destination client 11*b* over a path 14*c*.

Figure 3:
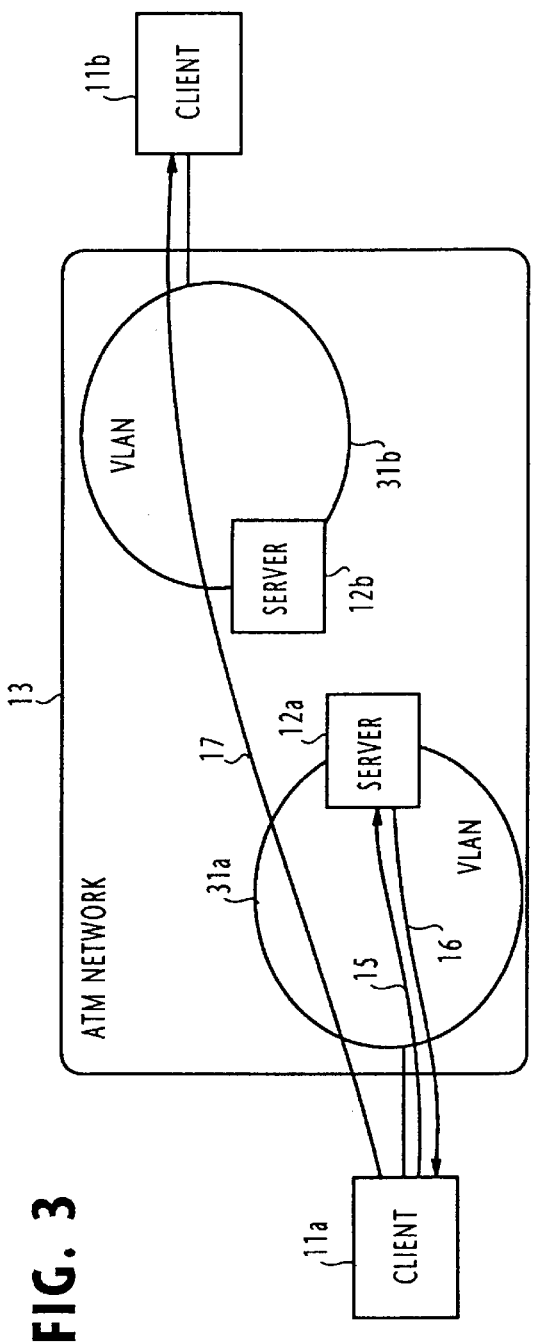
FIG. 3 is a block diagram of an ATM network according to the present invention in the case of connection-oriented traffic.
Figure 4:
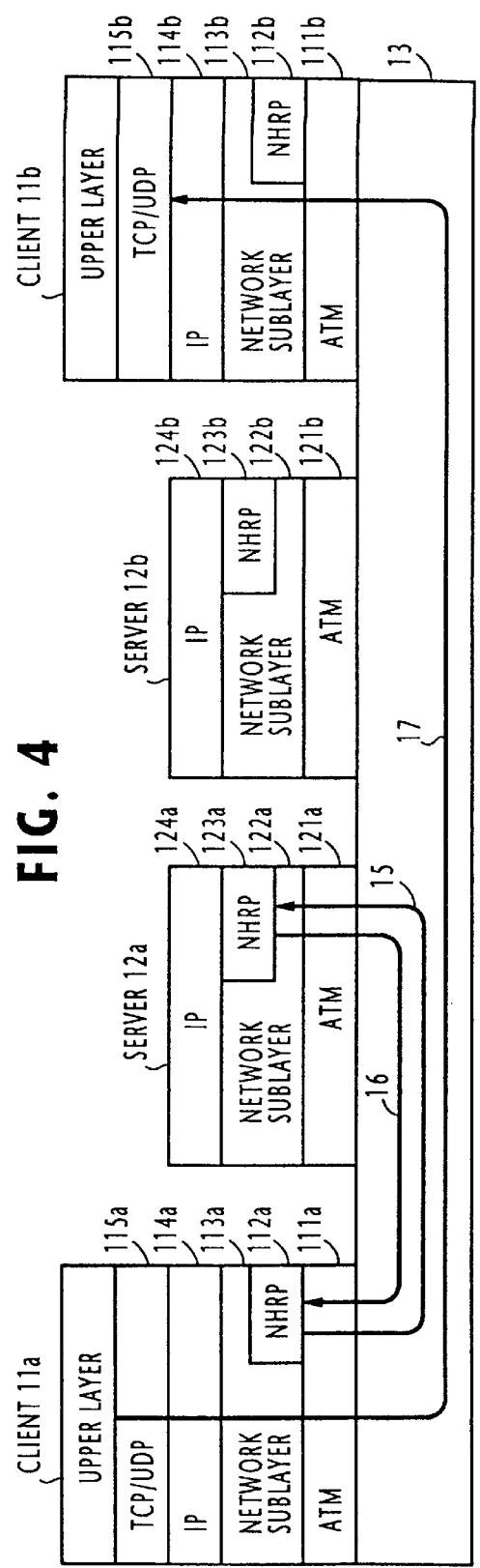
FIG. 4 is an illustration of protocol stacks of the ATM network and signal paths in the case of connection-oriented traffic.

If the priority field of a packet has a value of "8" (e.g., video traffic) or "15" (e.g., audio traffic), then, the source client 11*a* recognizes that the packet has a connection-oriented traffic and sends an NHR (next hop resolution) request message over a path 15 to the server 12*a* as shown in FIGS. 3 and 4. Using the NHRP 123*a*, the server 12 resolves the ATM address of the destination client 11*b* and returns an NHR reply message over a path 16 to the source client 11*a*. By using the ATM address contained in the reply message, the client 11*a* sends a connection-setup message trough the network to the destination 11*b* to establish a connection 17. Data packets are subsequently sent from the client 11*a* over the established connection 17 to the destination 11*b*. In is way, delays which would otherwise be associated with the cell assembling and routing procedures by routers on audio or video data are eliminated.

If the IPv4 protocol is used instead of the IPv6 protocol, the port number of the TCP/UDP layer is examined, instead of the priority field of the IPv4 packer, to determine the identity of an upper-layer application.

What is claimed is:

1. A communication method for an ATM network which is formed by a plurality of logical subnetworks to each of which a server and at least one client are connected, the server having means for resolving an ATM address of a destination client using a layer-3 address of a message from a source client, and means for routing a packet according to a layer-3 address of the packet, the method comprising the steps of:
   a) examining, at said source client, a layer-3 header of a packet to determine whether the packet has a connection-oriented traffic or a connectionless traffic;
   b) if the packet has a connectionless traffic, transmitting the packet from said source client to said server for causing the server to route the packet through the network;
   c) if the packet has a connection-oriented traffic, transmitting a request message from said source client to said server for causing the server to resolve an ATM address of a destination client and return a reply message containing the resolved ATM address; and
   d) receiving the reply message at the source client and transmitting therefrom a signaling message containing the resolved ATM address to the network to establish a connection, and subsequently transmitting data packets over the established connection.

2. The method of claim 1, wherein said packet is an IPv6 protocol packet and the step (a) examines a priority field of the packet to determine whether the packet has a connection-oriented traffic or a connectionless traffic.

3. The method of claim 1, wherein said server is arranged to resolve said ATM address and return said reply message according to a next hop resolution protocol (NHRP).

4. An ATM network comprising:
   a plurality of logical subnetworks, each of the logical subnetworks comprising a server and at least one client, said server having means for resolving ATM addresses of destination clients from a layer-3 address of an ATM address resolution request message from a source client and means for routing a packet to a server of another subnetwork by using a layer-3 address of the packet,
   said source client examining a layer-3 header of a packet to determine whether the packet has a connection-oriented traffic or a connectionless traffic, (a) transmitting, if the packet has a connectionless traffic, the packet to said server for causing the server to route the packet through the network, and (b) transmitting, if the packet has a connection-oriented traffic, an ATM address resolution request message to said server, receiving a reply message therefrom containing a resolved ATM address, transmitting a signaling message containing the resolved ATM address to the network to establish a connection and transmitting data packets over the established connection.

5. An ATM network as claimed in claim 4, wherein said packet is an IPv6 protocol packet and wherein said source client is arranged to examine a priority field of the packet to determine whether the packet has a connection-oriented traffic or a connectionless traffic.

6. An ATM network as claimed in claim 4, wherein said server is arranged to resolve said ATM address and return said reply message according to a next hop resolution protocol (NHRP).

7. A communication method for an ATM network which is formed by a plurality of logical subnetworks to each of which a server and at least one client are connected, the server having means for resolving an ATM address of a destination client using a layer-3 address of a message from a source client, and means for routing a packet according to a layer-3 address of the packet, the method comprising the steps of:
   a) examining, at said source client, a port number in a layer-4 header of a packet to determine whether the packet has a connection-oriented traffic or a connectionless traffic;
   b) if the packet has a connectionless traffic, transmitting the packet from said source client to said server for causing the server to route the packet through the network;
   c) if the packet has a connection-oriented traffic, transmitting a request message from said source client to said server for causing the server to resolve an ATM address of a destination client and return a reply message containing the resolved ATM address; and
   d) receiving the reply message at the source client and transmitting therefrom a signaling message containing the resolved ATM address to the network to establish a connection, and subsequently transmitting data packets over the established connection.

8. An ATM network comprising:
   a plurality of logical subnetworks, each of the logical subnetworks comprising a server and at least one client;
   said server having means for resolving ATM addresses of destination clients from a layer-3 address of an ATM address resolution request message from a source client and means for routing a packet to a server of another subnetwork by using a layer-3 address of the packet;
   said source client examining a port number in a layer-4 header of a packet to determine whether the packet has a connection-oriented traffic or a connectionless traffic; and when the packet has a connectionless traffic, said source client transmitting the packet to said server for causing the server to route the packet through the network, and when the packet has a connection-oriented traffic, said source client:

transmitting an ATM address resolution request message to said server, receiving a reply message therefrom containing a resolved ATM address, and transmitting a signaling message containing the resolved ATM address to the network to establish a connection and transmitting data packets over the established connection.

9. A communication method for a source client in an ATM network, comprising:

receiving a packet at said source client;

determining a traffic type of said packet by examining a header of said packet, wherein said traffic type is one of a connectionless traffic type and a connection-oriented traffic type;

when said traffic type of said packet is said connectionless traffic type, transmitting said packet from said source client to a server so as to cause said server to route said packet through said network; and when said traffic type of said packet is said connection-oriented traffic type:

transmitting a request message from said source client to said server, said request message indicating a destination client, receiving a reply message containing a resolved ATM address relating to said destination client, transmitting from said source client a signaling message containing said resolved ATM address to establish a connection, and transmitting subsequent data packets over said connection.

10. The communication method for a source client in an ATM network as set forth in claim 9, wherein:

said packet has a packet format according to IPv4, said packet has a layer-4 packet header, and said determination of said traffic type of said packet is based on a port number in said layer-4 packet header of said packet.

11. The communication method for a source client in an ATM network as set forth in claim 9, wherein:

said packet has a packet format according to IPv6, said packet has a layer-3 packet header, and said determination of said traffic type of said packet is based on a priority field in said layer-3 packet header of said packet.

\* \* \* \* \*